United States Patent [19]
Kullman et al.

[11] Patent Number: 4,614,901
[45] Date of Patent: Sep. 30, 1986

[54] SERVO POWER AMPLIFIER HAVING LOAD EQUALIZATION

[75] Inventors: Uri Kullman, Northridge; William H. Jordan, Arcadia, both of Calif.

[73] Assignee: Kennedy Company, Monrovia, Calif.

[21] Appl. No.: 787,413

[22] Filed: Oct. 15, 1985

[51] Int. Cl.⁴ .................................... H02P 1/58
[52] U.S. Cl. .................................... 318/99; 318/109; 318/112; 318/54; 307/28
[58] Field of Search .............. 318/99, 100, 112, 7, 318/109, 54; 323/2; 307/28

[56] References Cited

U.S. PATENT DOCUMENTS

| | | | |
|---|---|---|---|
| 3,760,246 | 9/1973 | Gurwicz et al. | 318/99 X |
| 4,023,081 | 5/1977 | Murray et al. | 318/109 |
| 4,092,571 | 5/1978 | Hopkins et al. | 318/109 X |
| 4,361,788 | 11/1982 | Melocik | 318/99 X |
| 4,482,848 | 11/1984 | Heal et al. | 318/99 X |

Primary Examiner—B. Dobeck
Attorney, Agent, or Firm—John K. Williamson

[57] ABSTRACT

A servo power amplifier for driving multiple DC motors (10, 12) employs a load equalization circuit (36) which allows reduction of the overall number of circuit components required to drive the motors. The load equalization circuit is coupled in parallel with each of the motor drive circuits (14, 16) across the power source (46, 48) and controls an inductive load (84) which temporarily stores energy that is returned to the power source from the motors. The equalization circuit is pulse width modulated in accordance with a control signal which is derived by sensing the current flowing through the inductive load and using a sensing circuit (44) to determine the difference in the magnitude of the positive and negative voltages supplied by the power source. The equilization control circuit and the motor drive circuits are each T-configured and employ no more than two switching elements for controlling current flow.

22 Claims, 2 Drawing Figures

SERVO POWER AMPLIFIER HAVING LOAD EQUALIZATION

TECHNICAL FIELD

The present invention broadly relates to power amplifiers for driving inductive loads, and deals more particularly with an amplifier for driving a plurality of reversible direct current motors, which includes equalization for balancing the load on a direct current, dual polarity power supply.

BACKGROUND ART

Multiple, servo-controlled DC motors which are reversible to provide a driving force in either of two rotational directions, are employed in various applications, such as magnetic tape drives, for example. The motors are controlled by amplifier circuits which are pulse width modulated to provide precise motor control. In the past, the motor control circuit was implemented using a so-called "H"-bridge configuration in which the winding of the motor is connected between the legs of the "H" and each segment of the legs includes a power transistor for controlling the flow of current through the motor. Additionally, the H-bridge included four diodes which provide a path for reversed or "freewheeled" current flow from the motor to the power supply.

In order to sense the current flowing through the motor in the H-bridge, or full-bridge circuit, two sensing resistors per motor were required (which were, by necessity, physically large in order to accommodate the required power dissipation in the circuit) or a more expensive current-sensing device (e.g., a transformer) was required. Thus, the prior H-bridge configuration used a substantial number of circuit components and was relatively complicated in overall circuit design. Additionally, in some cases, the host power supply cannot accommodate the energy transferred back to the power supply during "freewheeling" diode conduction. In this event, this energy must be stored or dissipated internally in the amplifier.

SUMMARY OF THE INVENTION

The present invention overcomes each of the deficiencies of the prior art H-bridge configuration mentioned above and provides an improved power amplifier which is not only less costly due to the fewer components which are employed, but results in a more physically compact unit.

According to one aspect of the invention, a system for controlling at least two direct current, reversible motors driven by a dual polarity direct current power source is provided which includes a motor control circuit operative to control the delivery of electrical power from the power source to a corresponding motor, and means coupled with each of the motor control circuits for balancing the load on the power source, thereby equalizing the power supplied by the source. Equalization is achieved by means of a T-circuit, or half-bridge, which includes a pair of transistors that control an inductor which provides a means for energy storage for the required process of energy transfer between the positive and negative terminals of the power supply in order to compensate for energy transferred back to the power supply from the motors. Each of the motor control circuits as well as the equalization circuit is controlled by a pulse width modulator. The flow of energy to and from the equalization circuit is controlled in part by a control signal which is generated by sensing the difference between the positive and negative voltages supplied by the source.

As a result of the use of the equalization circuit, it is necessary to employ only two power transistors in T-circuits for each motor; this reduces, by one-half, the number of components for each motor control circuit, compared with the previous H-bridge circuit, and results in an overall reduction in components used when at least two motors are employed in the system.

According to another broad aspect of the invention, the invention provides a method for controlling at least two direct current motors driven by a source of DC power providing positive and negative voltages, which comprises the steps of: delivering pulses of energy from the source to each of the motors, where the widths of the pulses correspond to the magnitude of energy delivered to the motor, returning a portion of the energy delivered in the preceding step from each of the motors to the opposing supply circuit, thereby creating an imbalance between the positive and negative voltages supplied by the power source, and temporarily storing in an inductive load a portion of the energy returned to the source, thereby balancing the positive and negative voltages supplied by the source.

These and other features of the invention will be made clear or will become apparent during the course of the following description of the preferred embodiment of the present embodiment.

BRIEF DESCRIPTION OF THE DRAWINGS

In the drawings, which form an integral part of the specification and are to be read in conjunction therewith, and in which like reference numerals are employed to designate identical components in the various views.

DESCRIPTION OF THE PREFERRED EMBODIMENT

Figure 1:
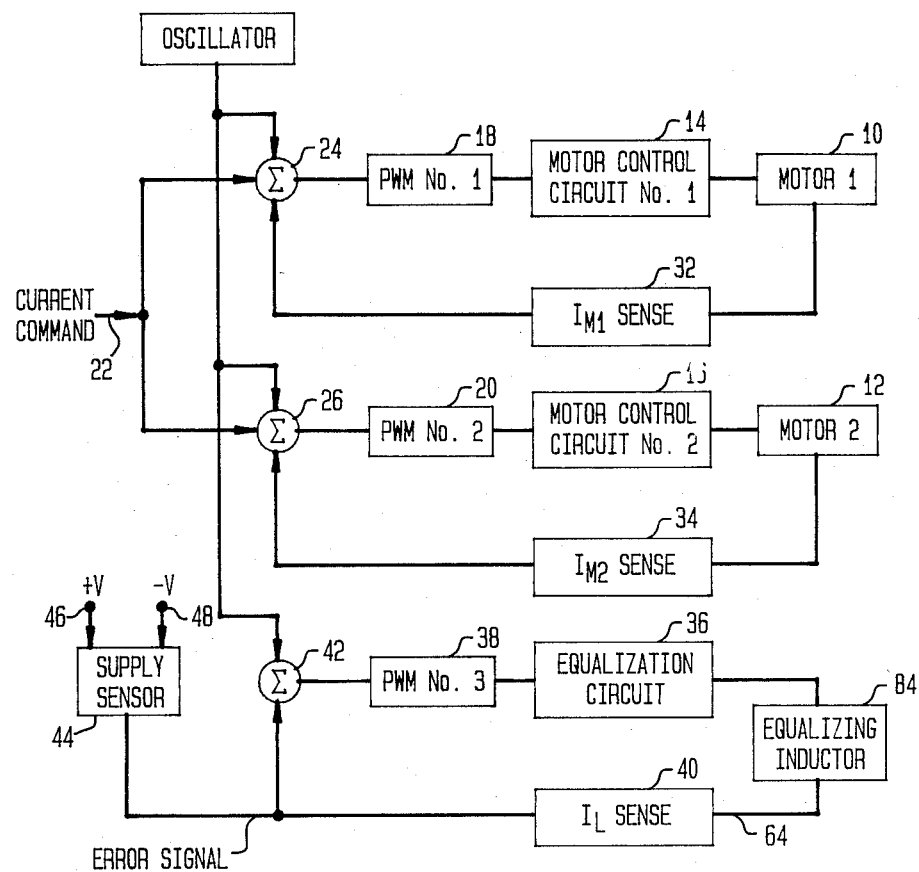
FIG. 1 is a broad block diagram of a multiple motor system employing a servo power amplifier having load equalization in accordance with the preferred embodiment of the present invention.

Referring first to FIG. 1, the present invention broadly involves a servo power amplifier for controlling the operation of a pair of direct current reversible motors 10, 12 which may be employed, by way of example, to operate a magnetic tape drive or the like. The motors 10, 12 are driven by switched amplifiers designated as motor control circuits 14 and 16, respectively. The motor control circuits 14, 16 are in turn respectively driven by pulse width modulators 18 and 20 which are of conventional design and therefor need not be described in detail herein. The output of an oscillator 28 is combined at sum points 24 and 26 with a current command signal 22 as well as the feedback signal derived from sensors 32, 34 which respectively sense the magnitude of current flowing through the motors 10, 12. The outputs of the pulse width modulators 18, 20 are a series of switching pulses, the widths of which are proportional to the duration of time for which the corresponding motors 10, 12 are switched positive or negative. In other words, the pulse width modulators 18, 20 determine the amount of energy which is delivered to the motors 10, 12 and thus the magnitude and polarity of motor current.

As will be discussed later, the motor control circuits 14, 16 are of a simplified, T-circuit design and function in cooperation with the corresponding motors 10, 12 to return some of the energy stored in the motors 10, 12 to the DC power source of opposing polarity to that from which they are supplied. This return of power to the source from the motor results in an uncontrolled (high) supply voltage source which would potentially destroy the power source and the power amplifier if not equalized. According to the present invention, the load on the power source is equalized by creating an error signal which is a function of the difference between the positive and negative voltages supplied by the host power supply. This error signal, together with a feedback term derived from a current sensor 40 is summed at 42 to drive the pulse width modulator 38. As will be discussed later in more detail, the equalization control circuit 36, along with an equalizing inductor 84 is utilized for temporarily storing a quantity of energy.

Figure 2:
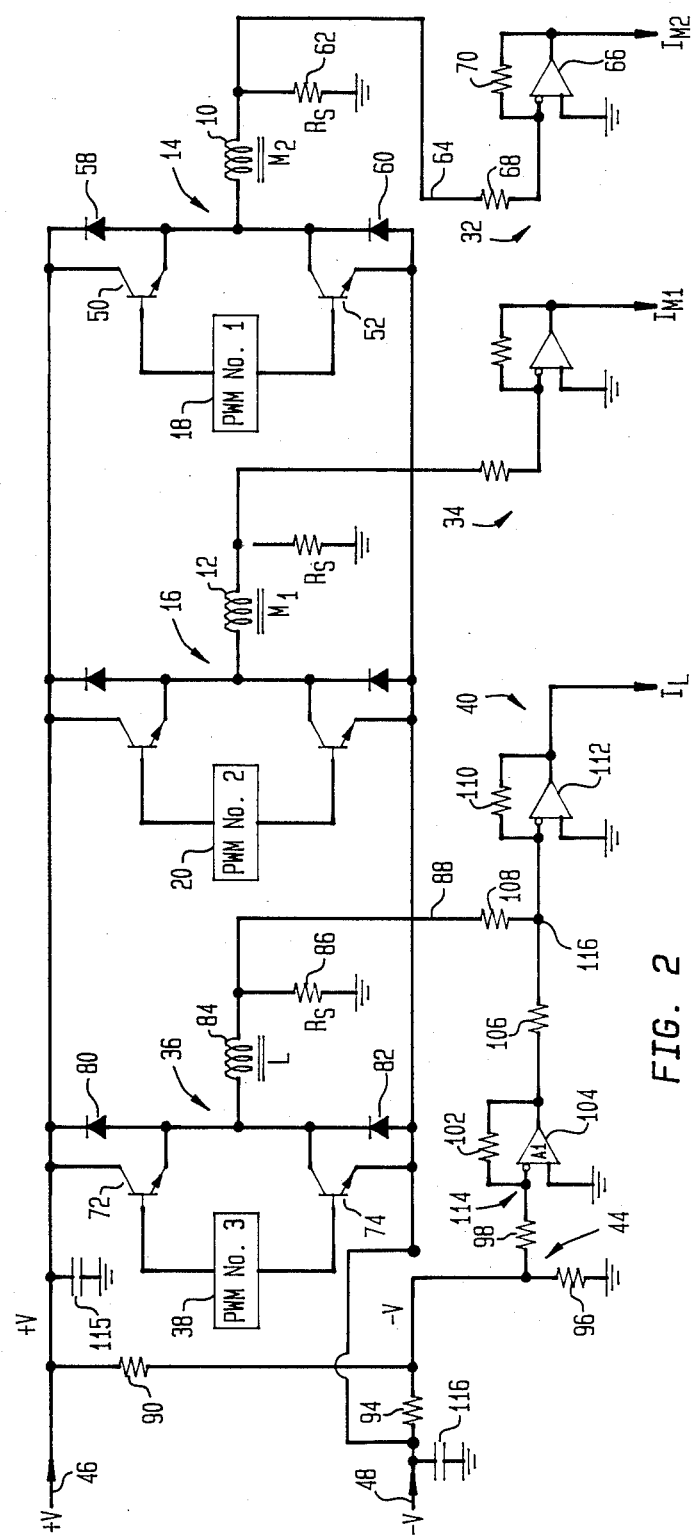
FIG. 2 is a detailed schematic diagram of the system shown in FIG. 1.

Referring now also to FIG. 2, voltage is supplied to the system from a DC power supply source having positive and negative voltage supply terminals 46 and 48 respectively. The motor control circuits 14, 16 as well as the equalization control circuit 36 are connected in parallel relationship to each other across the supply terminals 46, 48.

The details of the first motor control circuit 14 will now be described, it being understood that the second motor control circuit 16 is identical to the first circuit 14. The motor control circuit 14 broadly includes a T-circuit configuration in which the negative or low side of the motor winding 10 (hereafter used to represent the motor) is connected to ground through a resistor 62. The positive or high side of the motor winding 10 is connected to the anode of a diode 58 while the cathode thereof is connected to the positive voltage supply terminal 46. Similarly, the high side of the motor winding 10 is connected to the cathode of a diode 60, while the anode thereof is coupled to the negative voltage supply terminal 48.

The high side of the motor winding 10 is connected in series with the collector-to-emitter path of a power transistor 50, the collector thereof being coupled to the positive terminal 46. Similarly, the high side of the motor winding 10 is connected in series relationship with the collector-to-emitter path of a second power transistor 52, the emitter thereof being connected to the negative voltage supply terminal 48. The bases of transistors 50 and 52 are controlled by pulses output from the pulse width modulator 18.

The head of the T-circuit described above thus consists of the transistors 50, 52, while the leg or base of the circuit consists of the motor winding 10. As will be discussed below, diodes 58, 60 function to close circuits between the motor winding 10 and the positive and negative voltage terminals 46, 48 when the respectively associated transistor 50, 52 is turned off, thereby allowing current to continue to flow through the motor winding 10.

The current sensing circuit 32 for sensing the magnitude of current flowing through the motor winding 10 includes an input line 64 connected to the inverting input of an operational amplifier (Op-Amp) 66 through a resistor 68. A resistor 70 is coupled in feedback relationship to the Op-Amp 66 and the non-inverting input thereof is referenced to ground. The Op-Amp 66 functions as a voltage amplifier to amplify the voltage across sense resistor 62. This value representing the sensed current flowing through the motor winding 10 is delivered to a sum point 24.

The equalization control circuit 36 directs the energy that was delivered back to the power supply by motor control circuits 14 and 16, to the equalizing inductor 84 and then back to the opposing power supply storage capacitor 115 or 116. The equalization circuit 36 further includes a pair of power transistors 72, 74 and two diodes 80 and 82; the foregoing components are connected in a T-circuit configuration identical to that previously described with reference to the description of the motor control circuit 14. In other words, the high or positive side of the inductive load 84 is connected to the positive voltage terminal 46 through transistor 72, as well as through diode 80. The negative voltage supply terminal 48 is connected to the high side of the inductive load 84 through the transistor 74 as well as through the diode 82.

The supply sensor 44 comprises a voltage divider network consisting of resistors 90, 94 and 96. This voltage divider network produces an error signal by way of resistor 98 at a summing point 114 which is equivalent to the net error between the magnitudes of the positive and negative supply voltages. This voltage error is amplified by an Op-Amp 104 which is provided with a gain resistor 102, and the output thereof is fed through a resistor 106 to a sum point 116. The negative or low side of the inductive load 84 is connected to ground through a resistor 86 and is also coupled to the sum point 116 via a sensing line 88 and resistor 108. Thus, a signal proportional to the magnitude of current flowing through the inductive load 84 and the error signal is summed at 116 and the resulting signal is amplified by Op-Amp 112 with gain resistor 110. As shown in FIG. 1, the resulting output of Op-Amp 112 is delivered to a summer 42 where it is combined with the output of the oscillator 28.

The operation of the system will now be described with particular reference to motor 10, it being again understood that the description applies equally to the operation of motor 12. Assuming that it is desired to rotate the motor 10 in a particular direction, e.g., clockwise, a series of pulses are delivered from the pulse width modulator 18 to the motor control circuit 14, and more particularly to the transistors 50 and 52. Assuming net positive current in motor 10 is desired, transistor 52 remains off and transistor 50 is turned on thereby allowing current flow from the storage capacitor 115 of the positive voltage terminal 46, through the collector-to-emitter path of power transistor 50, thence through the motor winding 10. The transistor 50 remains on for the duration of the positive pulse. When the pulse goes low, the transistor 50 is turned off and current flow through transistor 50 is terminated; however, current is allowed to continue to flow through the motor winding 10 in the same direction, which now sources energy to the storage capacitor 116 of negative voltage supply terminal 48 through diode 60. Transistor 50 is switched on and off by the pulse width modulator 18 at a duty cycle sufficient to deliver the proper current to the motor winding 10 to satisfy the closed-loop servo needs. Conversely, if it is desired to provide a net negative current in motor winding 10, transistor 50 is turned off and a series of pulses are delivered to the base of transistor 52 from the pulse width modulator 18. Transistor 52 is thereby turned on, allowing current to flow from ground through resistor 62, motor winding 10, and the collector-emitter path of transistor 52, finally to the negative voltage supply terminal 48. As the switching pulse goes low, transistor 52 is switched off and current continues to flow through the motor winding 10 and diode 58 to the positive voltage supply terminal 46.

Since the motor winding 10 acts as inductive load, energy stored in the motor winding 10 is periodically transferred back to the power source, thereby increasing the positive or negative voltage supply thereof. In the absence of the present invention, this return of energy from the motor winding 10 to the power source would result in a supply voltage increase, thus increasing either the positive or negative supply voltage to a potentially damaging level for both the power supply and power amplifier. In accordance with the present invention, however, the equalization circuit 36 functions to transfer return energy to the supply from which the energy is drawn.

Assuming that the pulse width modulator 18 is turning on transistor 50, energy is drawn from the positive power supply storage capacitor 115, thereby feeding a positive current pulse through transistor 50 to the motor winding 10. The consequent drop in the available positive supply energy 46 is minimized by the equalizing inductor 84 which now sources energy (drawn from the negative supply storage capacitor 116 through transistor 74 during the previous cycle) through diode 80 back to the positive supply storage capacitor 115.

When pulse width modulator 18 turns transistor 50 off, motor winding 10 generates a negative voltage, biasing diode 60 to a conducting state; this allows motor winding 10 to maintain current flow in the same direction by sourcing energy to the negative power supply storage capacitor 116. The consequent increase in negative supply voltage 48 is minimized by the equalizing inductor 84 which now draws energy from the negative power supply storage capacitor 116 through transistor 74.

Conversely, when the pulse width modulator 18 turns on transistor 52, energy is drawn from the negative power supply storage capacitor 116, thereby feeding a negative current pulse through transistor 52 to motor winding 10. The consequent drop in negative supply voltage 48 is minimized by the equalizing inductor 84 which now sources energy (drawn from the positive supply storage capacitor 115 through transistor 72 during the previous cycle) through diode 82 back to the negative supply storage capacitor 116.

When pulse width modulator 18 turns transistor 52 off, motor winding 10 generates a positive voltage, biasing diode 58 to a conducting state; this allows motor winding 10 to maintain current flow in the same direction by sourcing energy to the positive supply storage capacitor 115. The consequent increase in positive supply voltage 46 is minimized by the equalizing inductor 84 which now draws energy from the positive power supply storage capacitor 115 through transistor 72.

The current sensing circuits 32 and 34 function to sense the magnitude of current flowing through the corresponding motor windings 10, 12 and this information is delivered to the pulse width modulators 18 and 20 in order to control current flow through the motors 10, 12.

The voltage supply sensor 44 sums the values of the positive and negative voltages and generates an error signal at terminal 114 representative of this voltage difference. The error signal is amplified by Op-Amp 104 and is summed at terminal 116 with a signal derived on line 88 which is representative of the current flowing through the inductive load 84. The resulting signal is fed through Op-Amp 112 and is combined with the oscillator signal at the summer 42, and is thereafter employed to control the pulse width modulator 38.

From the foregoing, it may thus be appreciated that a novel method is provided for controlling at least two direct current motors each having a motor winding which is powered by a source of direct current power which provides positive and negative voltages, which comprises the steps of: delivering pulses of power from the source to each of the motors, where the width of the pulses correspond to the magnitude of energy delivered to the motor; returning a portion of the energy from the motor winding to the voltage supply (thereby ordinarily creating an imbalance in the positive and negative voltages supplied by the power source); and, temporarily storing in an inductive load a portion of the energy returned from the motor, thereby balancing the positive and negative voltages supplied by the source.

It is recognized that those skilled in the art may make various modifications or additions to the preferred embodiment chosen to illustrate the invention without departing from the spirit and scope of the present contribution to the art. For example, the invention may be advantageously employed in a single motor system, such as a multiple phase brushless motor or a stepper motor, having two or more electrical coil windings. Accordingly, it is to be understood that the protection sought and to be afforded hereby should be deemed to extend to the subject matter claimed and all equivalents thereof fairly within the scope of the invention.

What is claimed is:

1. A system for controlling at least two direct current, reversible motors driven by a source of dual polarity direct current power, comprising:

a motor control circuit associated with each of said motors and coupled between the corresponding motor and said direct current power source, each motor control circuit being operative to control the delivery of power from said source to the corresponding motor and creating a voltage imbalance in said power source as a result of the return of power from the corresponding motor to said source; and means coupled with each of said motor control circuits and with said source for equalizing the load on said source whereby to balance the voltage supplied by said source.

2. The system of claim 1, wherein said motor control circuit includes no more than two switches respectively controlling the operation of said motor in opposite directions of rotation.

3. The system of claim 2, including means for pulse width modulating each of said switches.

4. The system of claim 1, wherein each of said motor control circuits includes a T-circuit, said T-circuit including a pair of transistors in the head of the T, the motor being connected in the central leg of the T.

5. The system of claim 1, including means for sensing the magnitude of current flowing through said motor.

6. The system of claim 1, wherein said equalizing means includes an equalization circuit coupled in parallel relationship with each of said motor control circuits, said equalization circuit including inductive means for storing the electrical energy returned from each of said motors to said source.

7. The system of claim 6, wherein said equalization circuit includes a pair or electrically controllable switches controlling the delivery of electrical energy from said motor to said inductive means, said system further including means for pulse width modulating each of said switches.

8. The system of claim 7, wherein said switches each include a transistor and said equalization circuit further includes a pair of diodes coupled between said inductive means and said power source.

9. A system for controlling at least two direct current, reversible motors coupled with a source of direct current power having positive and negative power supply terminals providing positive and negative voltages for respectively driving said motors, comprising:
- a motor control circuit for each of said motors and coupled between the corresponding motor and said source, each motor control circuit including not more than a first and second switch coupled between the winding of the motor and said source for respectively controlling the flow of current through said winding in opposite directions, each of said motor control circuits being operative to return power to said source; and
- means coupled with each of said motor control circuits and with said source for equalizing the positive and negative voltages on said source to prevent overload on said source resulting from the return of power to said source from said motors.

10. The system of claim 9, wherein said switches each comprise a transistor.

11. The system of claim 9, wherein said equalizing means includes:
- inductive means for storing energy for the required process of transfer of energy between the positive and negative power supply terminals, and
- a pair of switches coupled between the motor control circuits and said inductive means for controlling the flow of energy from said motor control circuits to said inductive means.

12. The system of claim 11, including means for pulse width modulating the switches of said equalizing means and of each of said motor control circuits.

13. The system of claim 11, wherein:
- said pair of switches comprise a pair of transistors respectively connected between said inductive means and the positive and negative sides of said source, and
- said equalizing means further includes a pair of diodes respectively connected between said inductive means and the positive and negative sides of said source.

14. The system of claim 11, including control means for controlling the operation of said pair of switches, said control means including:
- means for generating a control signal representative of the magnitude of imbalance between the positive and negative voltages of said source and the magnitude of current flowing through said inductive means, and
- means responsive to said control signal for modulating said pair of switches.

15. The system of claim 14, wherein said control signal generating means includes means for generating an error signal representative of the difference between the positive and negative voltages of said source, and means for sensing the current flowing through said inductive means.

16. A system for controlling at least two direct current, reversible motors powered by a source of direct current power, said power source including a pair of power output terminals respectively supplying positive and negative voltages, comprising:
- a motor control circuit for each of said motors, each control circuit including
    (1) first and second switches respectively coupled between said one side of said motor and said power output terminals, said first and second switches being operative to control the flow of current in respective opposite directions through said motor,
    (2) a ground connection coupled with the opposite side of said motor,
- each motor control circuit being operative to control the operation of the corresponding motor and returning electrical energy to said source, the return of electrical energy to said source resulting in an imbalance in the positive and negative supply voltage of said source; and
- an equalization control circuit coupled with said output terminals for equalizing the positive and negative voltages of said source.

17. The system of claim 16, wherein said equalization circuit includes means for temporarily storing energy returned from each of said motor control circuits and no more than two switches for controlling the flow of energy to said inductive means.

18. The system of claim 16, including means for generating an error signal representing the difference in the positive and negative voltage supplied by said source and means responsive to said error signal for controlling said equalization circuit.

19. Apparatus for controlling an electrical motor system of the type having at least two electrical coil windings adapted to be energized by a dual polarity direct current power source supplying positive and negative voltages, comprising:
- a pair of motor control circuits respectively associated with said coil windings and coupled between the corresponding coil winding and said direct current power source, each motor control circuit being operative to control the delivery of electrical power from said source to the corresponding coil winding and ordinarily creating a voltage imbalance in said power source as a result of the return of electrical power from the corresponding coil winding to said power source; and
- means coupled with each of said coil windings and with said power source for equalizing the load on said power source whereby to balance the positive and negative voltages supplied by said source.

20. The apparatus of claim 19, wherein each of said motor control circuits includes no more than two switches respectively controlling the delivery of electrical power from said power source to the corresponding coil winding.

21. A method for controlling at least two direct current motors powered by a source of direct current power supplying positive and negative voltages, comprising the steps of:
(A) delivering pulses of electrical energy from said source through a supply circuit to each of said motors, the width of said pulses corresponding to the magnitude of electrical energy delivered to the motors;

(B) returning a portion of the electrical energy delivered in step (A) from each of the motors to the supply circuit, thereby creating an imbalance between the positive and negative voltages supplied by said power source; and (C) temporarily storing in an inductive load a portion of the electrical energy returned in step (B), thereby balancing the positive and negative voltages supplied by said source.

22. The method of claim 21, including the steps of:

generating an error signal representative of the difference between the positive and negative supply voltages, and modulating the flow of electrical energy to the inductive load in accordance with the magnitude of the error signal.

* * * * *